(12) United States Patent
Canning et al.

(10) Patent No.: US 9,319,479 B2
(45) Date of Patent: *Apr. 19, 2016

(54) SUGGESTING A DISCUSSION GROUP BASED ON INDEXING OF THE POSTS WITHIN THAT DISCUSSION GROUP

(75) Inventors: Benjamin Canning, Seattle, WA (US); Sabrina Kikkert, Seattle, WA (US); Stephen N. Anderson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/912,578

(22) Filed: Oct. 26, 2010

(65) Prior Publication Data

US 2011/0131283 A1  Jun. 2, 2011

Related U.S. Application Data

(63) Continuation of application No. 10/903,533, filed on Jul. 30, 2004, now Pat. No. 7,844,668.

(51) Int. Cl.
  *G06F 15/16* (2006.01)
  *H04L 29/08* (2006.01)
(52) U.S. Cl.
  CPC .................................. *H04L 67/32* (2013.01)
(58) Field of Classification Search
  CPC ......... H04L 67/32; H04L 51/32; H04L 51/34; H04L 51/36
  USPC .......................................................... 709/206
  See application file for complete search history.

(56) References Cited

U.S. PATENT DOCUMENTS

| | | | |
|---|---|---|---|
| 3,971,710 A | 7/1976 | Romankiw | |
| 5,819,092 A | 10/1998 | Ferguson et al. | |
| 5,828,894 A | 10/1998 | Wilkinson et al. | |
| 5,884,270 A | 3/1999 | Walker et al. | |
| 5,937,397 A | 8/1999 | Callaghan | |
| 6,427,161 B1 | 7/2002 | LiVecchi | |
| 6,438,580 B1 * | 8/2002 | Mears et al. | 709/204 |
| 6,493,703 B1 | 12/2002 | Knight et al. | |
| 6,564,246 B1 | 5/2003 | Varma et al. | |
| 6,581,096 B1 * | 6/2003 | Cottrille et al. | 709/223 |
| 7,082,458 B1 * | 7/2006 | Guadagno et al. | 709/204 |
| 7,240,095 B1 | 7/2007 | Lewis | |
| 7,287,214 B1 | 10/2007 | Jenkins et al. | |
| 7,860,889 B1 * | 12/2010 | Martino et al. | 707/784 |
| 2002/0038233 A1 | 3/2002 | Shubov et al. | |
| 2002/0092026 A1 | 7/2002 | Janniello et al. | |
| 2004/0172415 A1 * | 9/2004 | Messina et al. | 707/104.1 |
| 2006/0004914 A1 * | 1/2006 | Kelly et al. | 709/219 |

* cited by examiner

*Primary Examiner* — Joseph Greene
(74) *Attorney, Agent, or Firm* — Julie Kane Akhter; Tom Wong; Micky Minhas

(57) ABSTRACT

A system and corresponding methods for recommending a discussion group as an appropriate place to post a message are provided. In one embodiment, the system searches a plurality of existing posts to identify the posts that are similar to a subject of a user's message. The system identifies the discussion groups that contain the identified posts and selects one of the identified discussion groups to recommend as an appropriate discussion group to post the user's message.

18 Claims, 6 Drawing Sheets

SUGGESTING A DISCUSSION GROUP BASED ON INDEXING OF THE POSTS WITHIN THAT DISCUSSION GROUP

CROSS REFERENCE TO RELATED APPLICATION

This application is a continuation application of U.S. patent application Ser. No. 10/903,533, filed on Jul. 30, 2004, and entitled "SUGGESTING A DISCUSSION GROUP BASED ON INDEXING OF THE POSTS WITHIN THAT DISCUSSION GROUP," which is incorporated herein in its entirety by reference.

TECHNICAL FIELD

The described technology is directed to online community services and, more particularly, suggesting a discussion group to a user as a likely place to post a message.

BACKGROUND

The world wide web ("Web") provides an enormous distributed database of information interconnected by the Internet. The Internet is a world wide collection of thousands of networks that span over 100 countries and connect millions of computers. The number of users continues to grow rapidly and the Internet has quickly become a virtual means of communication, collaboration, commerce, entertainment, and the like.

The world wide connectivity and the rapidly growing number of Internet users is fostering the growth of online communities. A community is a virtual association of users who typically share a common interest. For example, communities form around topics such as politics, sports, hobbies, technology, and current events, to name a few.

Online discussion groups such as Usenet news groups, email lists, newsletters, bulletin boards, and forums, support these communities, including communication amongst the users in the communities. There are thousands of discussion groups covering a very large number of interests and generating a significant portion of the online content on the Internet. Many of the Internet users consider the content in these discussion groups to be the most important and useful content on the Internet.

The content in these discussion groups are in the form of messages posted by users. Typically, a user posts a message to a discussion group by filling out a form that includes the subject, the body of a message, and selecting a discussion group into which to post the message. A message, such as a question or a suggestion, that is not a reply to an earlier message starts a new thread. A thread is a series of messages that have been posted as replies to each other. A single discussion group typically contains many threads covering many topics. By reading the sequence of messages in a thread, a user is able to determine how the discussion has evolved.

A key problem for a user not familiar with the discussion groups is selecting a proper discussion group into which to post the message. Because of the large number of discussion groups, it is very likely that a user unfamiliar with the discussion groups will specify an incorrect or improper discussion group for the message. This results in the message being placed within an inappropriate discussion group, which contributes to the lack of organization of the content in, and usefulness of the discussion group.

Accordingly, a community services system and method that assists a user in posting a message by suggesting a discussion group that is appropriate for the message will have significant utility.

SUMMARY

In one embodiment, a community services server system receives a subject of a potential post to start a new thread, and uses the received subject to search the existing posts in the discussion groups. The system analyzes the results of the search to determine the discussion group that generated the highest number of hits during the search, and recommends this discussion group as a likely place to post the potential post.

In another embodiment, the system recommends a post or a thread containing the post to members of a community as a post or a thread that may be of interest to the member. While processing a new post, the system identifies members of the community who may be interested in the post. For example, the system may identify the members by analyzing the previous posts made by the members. The system recommends the new post or the thread containing the new post to the identified members as a post or a thread that may be of interest.

In still another embodiment, the system provides to a potential poster of a message the contact information for a member of a community who may be appropriate to answer or respond to the potential poster's message. The system receives the subject of the message from the potential poster and uses the received subject to identify a member of the community who may be appropriate to respond to the message. The system retrieves the contact information for the identified member and provides the contact information to the potential poster.

These and other aspects, features, and disadvantages of the described technology will be set forth in the description that follows and possible embodiments thereof, and by reference to the appended drawings, that describe technology not being limited to any particular embodiment(s) thereof.

DETAILED DESCRIPTION

Figure 1:
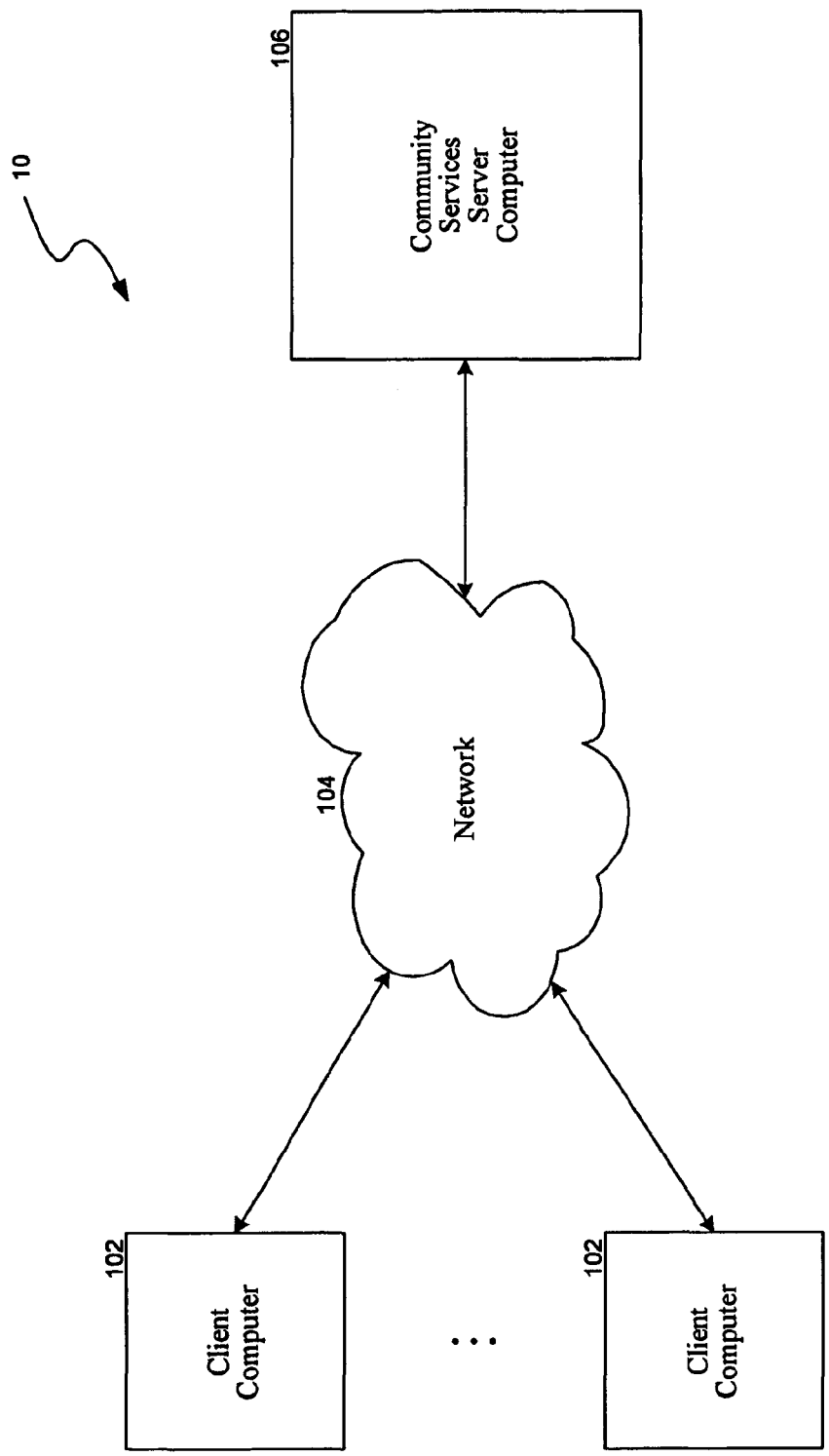
FIG. 1 is a block diagram illustrating an exemplary environment in which a facility may operate.

A system and corresponding methods for assisting a user in posting a message to in an online community are provided. In one embodiment, a software facility ("facility") suggests a discussion group that is appropriate to the topic of the message to be posted. For example, a user may have decided to post a message, but may be uncertain as to the discussion group to post the message in. To identify an appropriate discussion group, the facility may, for example, search the posts in the discussion groups for some part of the users post, such as the subject and/or the message body. Alternatively, the user may have provided a search query for use by the facility in searching the posts in the discussion groups. The discussion groups that get the most hits during the search are likely to be the most appropriate discussion group into which to post the user's message, since they are likely to be where similar discussions are taking place. The facility analyzes the search results to identify the most relevant discussion groups and suggests the identified discussion groups to the user as a likely place to post the users message.

In another embodiment, the facility may also identify threads that are related to the topic of the message. For example, a user may be interested in asking a question or making a suggestion about a product. Upon reviewing the threads, the user may find that there is no need to actually post the message. For example, the user's question may have already been answered in a thread or the user's suggestion may have already been made. In this way, a user can determine whether there is a need to actually post a message, and if there is a need, have appropriate discussion groups suggested into which the message can be posted.

In still another embodiment, the facility provides to a member of a community a recommendation of a post or thread that the member may be interested in. For example, while processing a new post, the facility identifies members of the community that may be interested in the post by means of search results: if search results of the subject and/or message of the post contain posts by the member, when that member visits or logs onto the community site, the facility recommends that the member look at the new post or the thread containing the post.

In yet another embodiment, the facility provides to a potential poster the contact information of a member of a community who may be appropriate to answer or respond to the potential poster's message. For certain designated members, such as preferred members of the online community, the facility maintains a list of subjects or topics of the threads or discussion groups that the designated member has participated in. The facility uses this information to suggest to a potential poster the contact information of a designated member who may be appropriate for responding to the potential poster's post. The potential poster can then directly communicate with the designated member instead of posting to the community. The facility may also provide the profile and/or reputation information regarding the designated member.

The various embodiments of the facility and its advantages are best understood by referring to FIGS. 1-6 of the drawings. The elements of the drawings are not necessarily to scale, emphasis instead being placed upon clearly illustrating the principles of the invention. Throughout the drawings, like numerals are used for like and corresponding parts of the various drawings.

FIG. 1 is a block diagram illustrating an exemplary environment 10 in which the facility may operate. As depicted, environment 10 includes one or more client computers 102 coupled to a community services server computer 106. In particular, client computers 102 and community services server computer 106 are coupled through a network 104.

Client computer 102 may be any type of computer system that provides its user the ability to load and execute software programs and the ability to access a network, such as, for example, network 104, and communicate with community services server computer 106. In one embodiment, client computer 102 is a personal computer executing a suitable operating system program that supports the loading and executing of application programs, such as a web browser or other suitable user interface program, for interacting with and accessing the services provided on community services server computer 106.

Network 104 is a communications link that facilitates the transfer of electronic content between, for example, the attached computers. In one embodiment, network 104 includes the Internet. It will be appreciated that network 104 may be comprised of one or more other types of networks, such as a local area network, a wide area network, a point-to-point dial-up connection, and the like.

In general terms, community services server computer 106 facilitates an online community by providing and managing the elements and services provided by the online community. The term "online community" or "community," as used interchangeably herein, is a dynamic and virtual association of users in an online environment. Community services server computer 106 facilitates the online community by providing and managing elements such as, by way of example and not limitation, a home page, access control, communication, discussion groups, notification service, and the like.

The computer systems of client computer 102 and community services server computer 106 may include a central processing unit, memory, input devices (e.g., keyboard and pointing devices), output devices (e.g., display devices), and storage devices (e.g., disk drives). The memory and storage devices are computer-readable media that may contain instructions that implement the facility.

Environment 10 is only one example of a suitable operating environment and is not intended to suggest any limitation as to the scope of use or functionality of the facility. Other well-known computing systems, environments, and configurations that may be suitable for use include client computers, server computers, hand-held or laptop devices, multiprocessor systems, microprocessor-based systems, programmable consumer electronics, network PCs, minicomputers, mainframe computers, distributed computing environments including any of the above systems or devices, and the like.

The facility may be described in the general context of computer-readable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Figure 2:
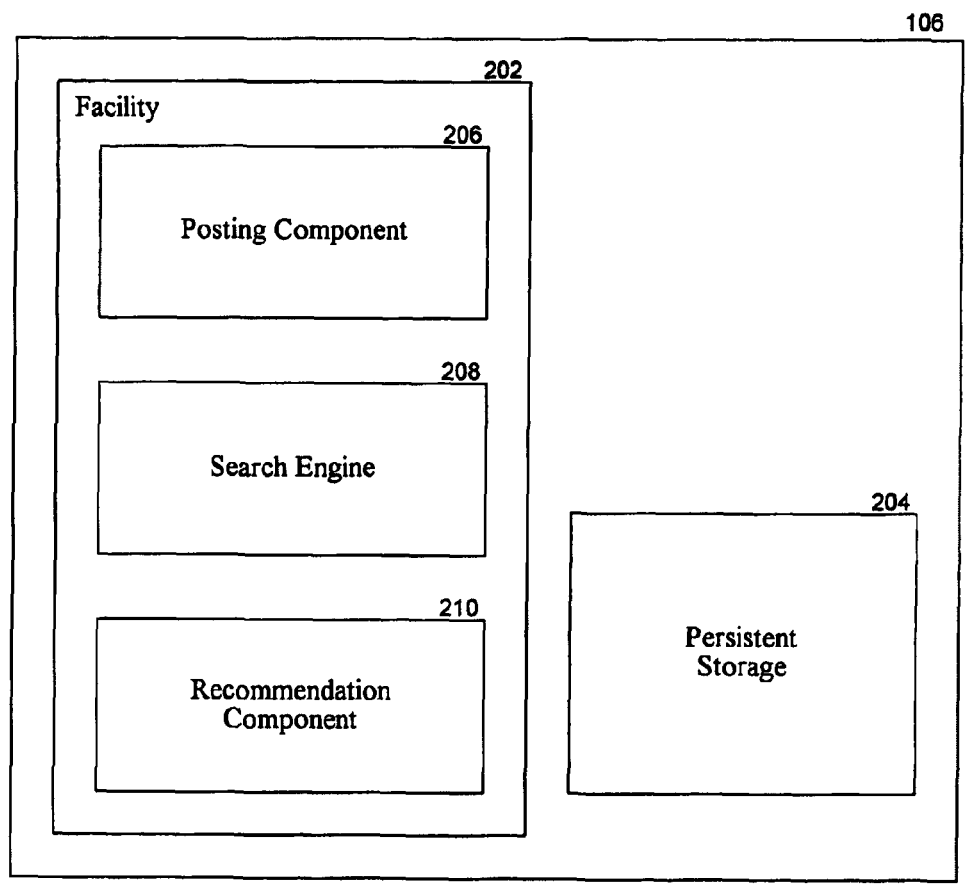
FIG. 2 is a block diagram illustrating selected components of a community services server computer, according to one embodiment.

FIG. 2 is a block diagram illustrating selected components of community services server computer 106, according to one embodiment. As depicted, community services server computer 106 comprises a facility 202 and a persistent storage 204. It will be appreciated that community services server computer 106 includes other components that are typically found on a computer suitable for hosting facility 202 as described herein. For example, community services server computer 106 also includes a processing unit, memory, network interface, input/output interfaces and devices, and the like.

Facility 202 generally functions to provide access to the community and the services and features supported by the community. In particular, facility 202 contains the logic for managing the discussion groups that are provided by the community and enabling the community members to post messages in the discussion groups and to view posted messages in the discussion groups.

In various embodiments, facility 202 periodically, for example, when a user requests to post a message, performs a search of the posts in the discussion groups and uses the information generated by the search to provide enhanced community services as described herein. For example, a search for a matching or a related post (e.g., a similar post) returns a number of attributes related to the post, such as, by way of example and not limitation, the post's identifier, the discussion group in which the post resides, and the poster (e.g., member) who posted or originated the post. Facility 202 maintains and utilizes the information (e.g., attributes) to enhance a user's experience in interacting within the community by, for example, assisting a user to post a message by recommending a list of discussion groups that may be appropriate for the message, recommending to a member a thread that may be of interest to the member, suggesting to a user contact information of one or more members that may be able to directly respond to the user's message, and the like.

As depicted in FIG. 2, facility 202 comprises a posting component 206, a search engine 208 and a recommendation component 210. Posting component 206 generally functions to post messages into discussion groups provided by the community. In one embodiment, posting component 206 is implemented as one or more pages (e.g., user interfaces) that provides its user a streamlined user experience for posting a message (e.g., submitting a question or a suggestion) into the community without requiring the user to first browse the full community experience.

For example, posting component 206 may display to a user requesting to post a message, a page that requests the subject of the message. The page may contain logic to request a search of existing posts to identify posts that are similar to the subject of the message. Posting component 206 may display to the user another page that displays a number of threads that contain the similar posts that were found during the search. The number of threads to display may have been previously specified by, for example, a system administrator. Posting component 206 may display to the user still another page that displays one or more discussion groups that contain the similar posts that were found during the search. It will be appreciated that posting component 206 may include other pages and logic to enable and assist a user interact with the discussion groups and the posts contained in the discussion groups.

Search engine 208 searches the posts existing in the discussion groups for certain words or phrases. In one embodiment, search engine 208 is implemented as a text search engine. For example, search engine 208 receives a subject of a post and/or the text of the message as input. Search engine 208 generates keywords from the received input (e.g., by eliminating the articles and other commonly used words) and performs a text search of the posts in the discussion groups for the keywords as search terms and returns a result set (e.g., a list of posts that contain at least one keyword and their attributes, including a number of hits generated during the search). It will be appreciated that search engine 208 may be implemented using other searching methods and technologies.

Recommendation component 210 manages the result set (e.g., the results of a search of existing posts performed by search engine 208), including the attributes returned by a search. In one embodiment, recommendation component 210 contains logic to process the result set to identify the relevant threads. For example, recommendation component 210 organizes the posts in the result set into their respective threads and uses a count of the number of hits per thread, or a variation of the number of hits per thread, to identify a number of most relevant threads. A "hit" is generated each time a keyword or search string is found in a post. Recommendation component 210 may also rank the relevant threads based on the count of the number of hits per thread, or a variation thereof.

Recommendation component 210 also contains logic to process the result set to identify discussion groups, including a recommended discussion group, that may be appropriate for a potential post. For example, recommendation component 210 analyzes the result set and counts the number of hits per discussion group. Recommendation component 210 identifies the discussion group having the most hits as a recommended discussion group into which to post the message.

Alternatively, recommendation component 210 can analyze the identified number of most relevant threads to identify discussion groups, including a recommended discussion group, that may be appropriate for a potential post. For example, recommendation component 210 organizes the threads into their respective discussion groups and counts the number of hits per discussion group, and recommends the discussion group having the largest number of hits.

In another embodiment, recommendation component 210 normalizes the result set to identify a recommended discussion group. For example, a discussion group that is overly broad and, therefore, which may discuss many different topics, or a discussion group which may have a proportionately higher number of posts may inappropriately be identified as a recommended discussion group into which to post the message by sheer volume. In this embodiment, recommendation component 210 normalizes the number of hits in a discussion group by the overall post activity of the discussion group, as a divisor, as shown below:

hits/posts per day for each discussion group in the result set.

Recommendation component 210 identifies the discussion groups having the highest number of normalized hits as recommended discussion groups into which to post the message. Facility 202 can categorize discussion groups as being overly broad by searching for the presence of various words or phrases, which are generally understood as having a broad meaning, in the title or subject of the discussion group. It is appreciated that recommendation component 210 can use a variation of the count of hits per discussion group to determine a recommended discussion group, such as the number of hits per number of posts in each discussion group, the average number of hits per number of threads in each discussion group, and the like.

In still another embodiment, recommendation component 210 uses an activity threshold, such as a number of posts per day, to eliminate discussion groups that do not meet the threshold requirement from the result set. The activity threshold may have been previously specified by, for example, a system administrator. Thus, an inactive discussion group, as determined based on the activity threshold, is not identified as a recommended discussion group to a poster of a message.

In yet another embodiment, recommendation component 210 contains logic to process the result set to identify one or more members of the community (e.g., registered users of the community that have posted messages in the community) that may be interested in the potential post. For example, recommendation component 210 utilizes the result set to identify one or more members of the community that may be interested in a potential post. When the potential post is actually posted into a discussion group, recommendation component 210 can associate the identified members of the community with the post. This information can then be used to recommend the post to one of the identified members of the community as a post that may be of interest to the member.

In one embodiment, the members that may be interested in a post are identified from a pool or list of preferred members of the community. A "preferred member" is a member that has attained a high reputation in the community. The reputation may be based on factors such as acknowledgment by other members of the community as determined by a number of votes, demonstrated expertise in providing high quality information and content in the community, active participation as determined by the number of posts in the community, and the like. Facility 202 may include logic to enable the designation of one or more members as being preferred members of the community.

Persistent storage 204 is a computer-readable storage medium that persistently stores the computer programs and data, including data structures, on community services server computer 106. For example, persistent storage 204 stores the information and data associated with the community supported by community services server computer 106 including the information regarding the members of the community, the discussion groups and their posts, for each member, a list of subjects or topics the member has been involved with, for each member, a list of posts that the member may be interested in, and the like. It will be appreciated that persistent storage 204 may store other content in addition to the content described.

The aforementioned components of community services server computer 106 are only illustrative, and community services server computer 106 may include other components and modules not depicted. The depicted components and modules may communicate with each other and other components comprising community service server computer 106 through mechanisms such as, by way of example, interprocess communication, procedure and function calls, application program interfaces, other various program interfaces, and various network protocols. Furthermore, the functionality provided for in the components and modules may be combined into fewer components and modules or further separated into additional components and modules.

In the discussion that follows, embodiments of facility 202 are described in conjunction with a variety of illustrative examples. It will be appreciated that the embodiments of facility 202 may be used in circumstances that diverge significantly from these examples in various respects.

Figure 3:
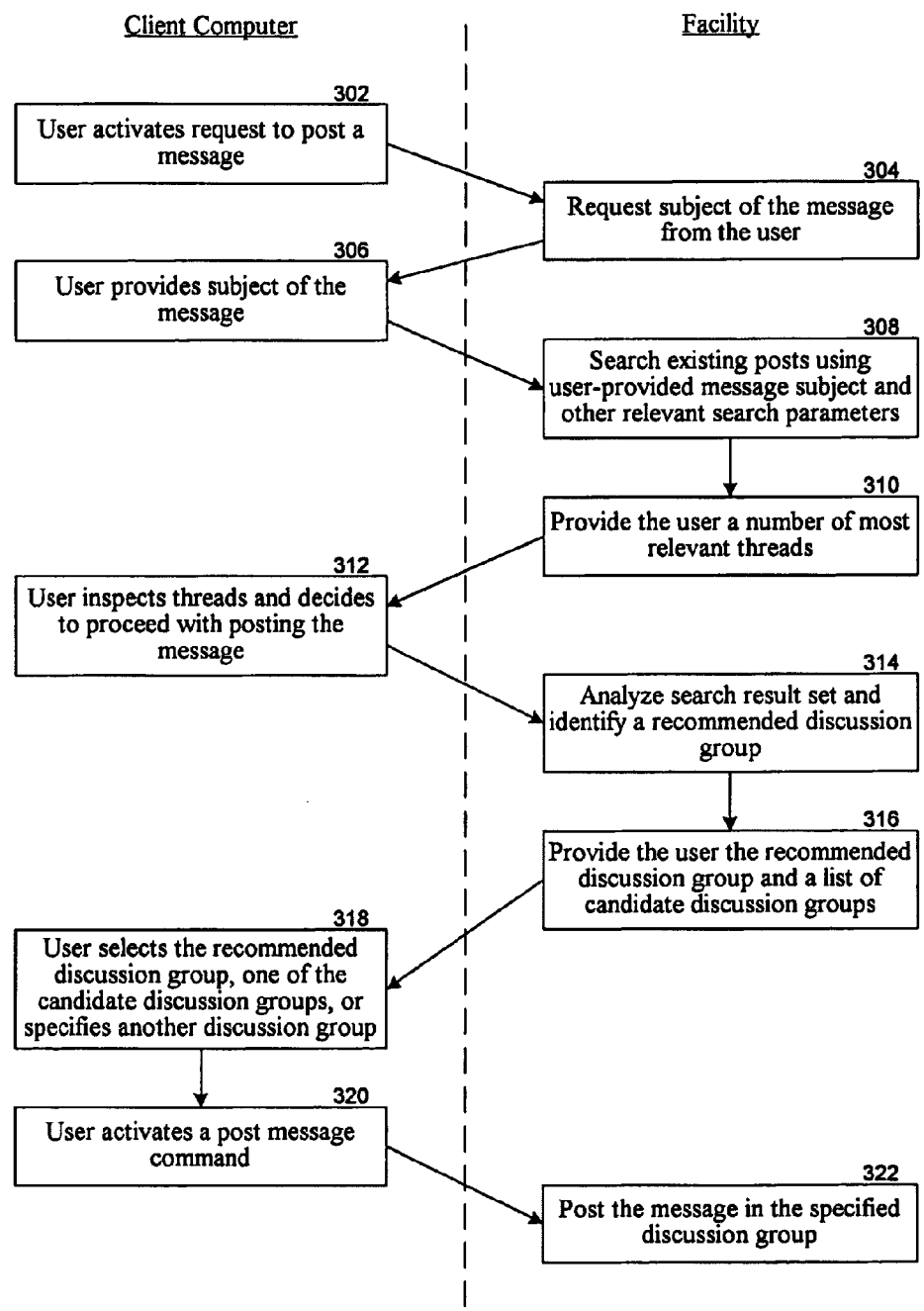
FIG. 3 illustrates an interaction between a client computer and a community services server computer in recommending a discussion group to a user, according to one embodiment.

FIG. 3 illustrates an interaction between client computer 102 and community services server computer 106 in recommending a discussion group to a user, according to one embodiment. By way of example, a user may be executing an application program, such as a word processor, on client computer 102. While using the application program, the user may encounter difficulty in figuring out how to perform a certain task. The user accesses a help feature provided by the application program, but doesn't find an answer that resolves the user's difficulty. Subsequently, the user may notice a 'Get help from other application program users' link that is provided in a tool bar. The link provides access to a community of users that is provided on community services server computer 106 and, in particular, the process of posting a message to one of the provided discussion groups.

At step 302, the user activates a request to post a message by clicking the displayed link using a pointing device, such as a mouse. The user may want to inquire about how to use a feature of the application program. This causes client computer 102 to transmit a message containing the request to facility 202 executing on community services server computer 106.

Facility 202 receives the request and, at step 304, requests a subject of the message from the user. In one embodiment, posting component 206 of facility 202 transmits a page, such as a user interface page or web page, through which the user provides the subject of the message to client computer 102, causing client computer 102 to display the page.

At step 306, the user provides the subject of the message in a subject box that is provided on the displayed page. The user may provide a few words or a phrase (using natural language) to specify the subject of the message. The user then activates a 'continue' or 'submit' button provided on the page, causing client computer 102 to transmit the user entered text to posting component 206.

In one embodiment, client computer 102 transmits additional information that may be useful in searching the existing posts to posting component 206. For example, when the user requests to post a message through a feature provided on the application program, client computer 102 may transmit other information, such as, the actions recently performed in the application program, the version of the application program, configuration information, as well as other information that could aid in identifying the specific issue and narrowing the search parameters. The application program itself, or another program executing on client computer 102, may monitor the actions performed by the application program and provide this information, as well as the other additional information, for transmission to posting component 206.

At step 308, posting component 206 searches the existing posts in the discussion groups using the text contained in the user-provided message subject and any other relevant search parameters. For example, posting component 206 may have also received from client computer 102 configuration and other information regarding the application program on client computer 102 that is being used by the user to post the message. In one embodiment, posting component 206 utilizes search engine 208 to search the existing posts. Search engine 208 searches the subject and message body of the existing posts using the user-provided message subject and returns a search result set that contains a list of posts that are similar to the user-provided message subject (e.g., posts that generated hits during the search). Search engine 208 also returns the attributes of the posts contained in the search result set.

At step 310, posting component 206 transmits a page displaying a list of a number of most relevant threads to client computer 102, causing client computer 102 to display the page. The page may display links to the threads, which can be used to access the posts contained in the threads. In the threads, the posts that contain the search terms may be indicated by, for example, a caret. In one embodiment, posting component 206 utilizes recommendation component 210 to identify the number of most relevant threads.

At step 312, the user inspects the displayed threads and, not finding a thread or a post that addresses the user's difficulty in using the feature of the application program, decides to proceed with posting the message (e.g., question). For example, the user enters the text of the message in a text box provided on the page. Subsequent to entering the message body, the user activates a 'continue' or 'submit' button provided on the page, causing client computer 102 to transmit the user entered text to posting component 206.

Facility 202 may require that a user be a member of the community before permitting the user to post a message. A user becomes a member by registering with the community. In this instance, posting component 206 may display a page requesting a user identification and password on client computer 102. If the user is a member, the user can provide the requested identification and password to log onto the community. If the user is not already a member, an option may be provided on the page through which the user can register to be a member of the community.

At step 314, posting component 206 analyzes the search result set to identify a discussion group to recommend to the user. In one embodiment, posting component 206 utilizes recommendation component 210 to determine a number of relevant discussion groups. The number may have been previously specified by, for example, a system administrator. Recommendation component 210 analyzes the search result set and returns the number of relevant discussion groups, including the most relevant discussion group designated as the recommended discussion group. For example, recommendation component 210 organizes the posts in the search result set into their constituent discussion groups and counts hits per discussion group to identify the number of discussion groups having the highest count of hits. In one embodiment, recommendation component 210 designates the discussion group having the highest number of hits as the recommended discussion group.

At step 316, posting component 206 transmits a page displaying the recommended discussion group and a list of candidate discussion groups to client computer 102, causing client computer 102 to display the page. The candidate discussion groups are composed of the number of discussion groups returned by recommendation component 210. The recommended discussion group and the list of candidate discussion groups may be displayed through a dropdown menu on the page, where the recommended discussion group appears as the default in the dropdown.

In an alternative embodiment, posting component 206 automatically posts the user's message in the recommended discussion group. Posting component 206 then transmits a page informing the user of the results of the post to client computer 102, causing client computer 102 to display the page.

At step 318, the user selects the recommended discussion group, one of the candidate discussion groups, or specifies another discussion group, for example, in a text box provided on the page. Having selected or specified a discussion group into which to post the message, the user activates a 'post message' button provided on the page, at step 320, causing client computer 102 to transmit the information and data on the page to posting component 206. At step 322, posting component 206 processes the post message command by posting the user's message in the specified discussion group.

Those of ordinary skill in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps without detracting from the essence of the invention.

Figure 4:
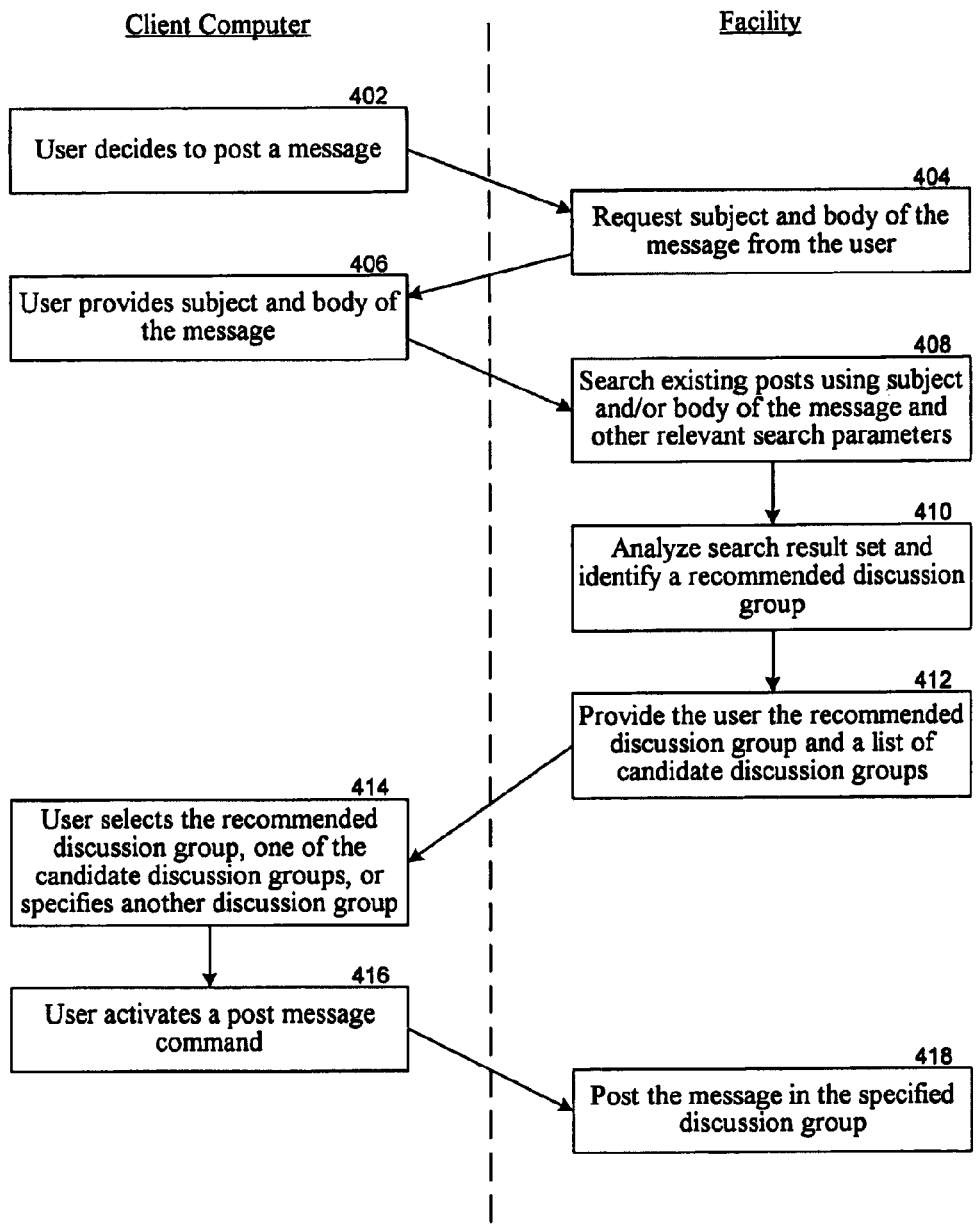
FIG. 4 illustrates an interaction between a client computer and a community services server computer in recommending a discussion group to a user, according to another embodiment.

FIG. 4 illustrates an interaction between client computer 102 and community service server computer 106 in recommending a discussion group to a user, according to another embodiment. By way of example, a user may be browsing the community provided on community services server computer 106 using client computer 102. During the browsing experience, the user may decide to post a message, but may not know the appropriate discussion group for the message. At step 402, the user activates a 'post a message' button on a currently displayed page on client computer 102, causing client computer 102 to transmit a message containing the request to facility 202 executing on community services server computer 106.

Facility 202 receives the request and, at step 404, requests a subject and a body of the message from the user. In one embodiment, posting component 206 transmits a page through which the user provides the subject of the message and the text of the message to client computer 102, causing client computer 102 to display the page.

At step 406, the user provides the subject of the message in a subject box and the text of the message in a text box, which are provided on the displayed page. The user then activates a 'continue' or 'submit' button provided on the page, causing client computer 102 to transmit the entered text to posting component 206.

At step 408, posting component 206 searches the existing posts in the discussion groups using the text contained in the user-provided message subject and/or message body and any other relevant search parameters. For example, posting component 206 may have also received from client computer 102 information regarding the application program (e.g., the actions recently performed in the application program, the version and other configuration information, etc.) on client computer 102 that is being used by the user to post the message. In one embodiment, posting component 206 utilizes search engine 208 to search the existing posts. Search engine 208 searches the existing posts using the user-provided message subject and/or message body and returns a search result set that contains a list of the identified posts (e.g., the posts that generated hits during the search), including the attributes of these posts.

Steps 410, 412, 414, 416 and 418 are substantially similar to the previously described steps 314, 316, 318, 320 and 322, respectively. In this embodiment, the user is not provided a listing of relevant threads that may contain a post similar to the user's post. Moreover, the search of the existing posts is performed after the user has authored the post (e.g., provided a subject and a message body) to identify and recommend a discussion group to the user.

Figure 5:
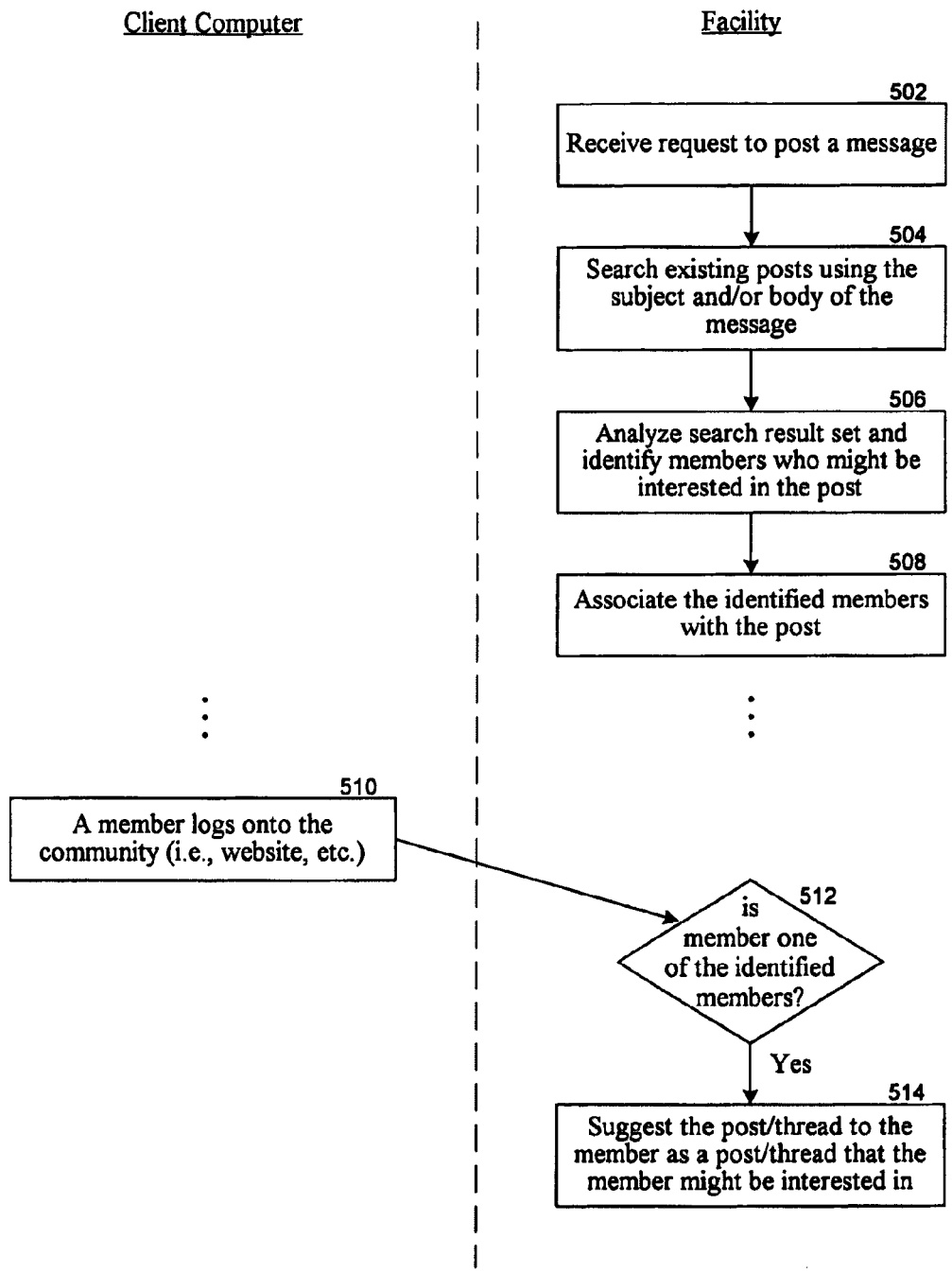
FIG. 5 illustrates a flow chart of an exemplary method by which a community services server computer suggests a thread that may be of interest to a member of the community, according to one embodiment.

FIG. 5 illustrates a flow chart of an exemplary method by which community services server computer 106 suggests a thread that may be of interest to a member of the community, according to one embodiment. At step 502, facility 202 of community services server computer 106 processes a request to post a message into a discussion group. For example, a user may have requested to post a question inquiring about a feature provided on an application program as discussed above.

At step 504, facility 202 searches the existing posts using the subject and/or body of the message. In one embodiment, search engine 208 is utilized to perform the search of the existing posts. In another embodiment, this search may have been previously performed, for example, during the process of guiding the user through the posting experience as previously described in conjunction with the discussion of FIG. 3 or 4.

At step 506, facility 202 analyzes the search result set to identify members of the community who may be interested in the post. In one embodiment, facility 202 utilizes recommendation component 210 to analyze the attributes of the posts contained in the search result set to identify the posters of the posts in the search result set. In another embodiment, recommendation component 210 identifies posters that posted responses to the posts in the search result set. At step 508, recommendation component 210 associates the identified members (e.g., the identified posters of the posts in the result set or responding members that responded to the posts in the result set) with the message, for example, by recording the association in a record or other suitable structure in persistent storage 204.

In one embodiment, recommendation component 210 associates the message with all members who posted the posts in the search result set. For example, an entry indicating the association to the message (e.g., an indication of the message) may be made in each member's profile, which is maintained by facility 202. In another embodiment, recommendation component 210 may use a threshold, such as a number of posts, to identify the members in the search result set. For example, a member would need to have posted at least the threshold number of messages in the search result set in order to be identified as a member who may be interested in the message. In still another embodiment, recommendation component 210 may only identify preferred members in the search result set as members who may be interested in the message.

Subsequently, a member logs onto the community at step 510. For example, the member may utilize a web browser program executing on client computer 102 and log onto a website provided by community services server computer 106. At step 512, facility 202 determines whether the member is one of the identified members. In particular, facility 202 determines whether there are any messages that have been posted by other members of the community, which are associated with the member.

If, at step 512, there are messages associated with the member, then, at step 514, facility 202 suggests the messages to the member as posts that may be of interest to the member. In one embodiment, facility 202 transmits a page displaying the messages (e.g., posts) or the threads that contain the messages to client computer 102, causing client computer 102 to display the page. The page may display links to the messages or links to the threads that contain the messages. The member can then view the messages or the threads by clicking on the appropriate link.

In another embodiment, facility 202 maintains, for each preferred member of the community, a list of subjects or topics of the threads or discussion groups that the preferred member of the community has participated in. The subjects or topics may be described or indicated by words or phrases that describe the posts that the preferred member tends to respond to. For example, when a preferred member posts a message, facility 202 can analyze attributes associated with the post, such as by way of example and not limitation, the subject of the post, the message body of the post, an indication of whether the post is a comment, response, or a question, the thread, the discussion group, etc., to generate or extract words or phrases that describe or indicate the topic of the post. Facility 202 can then record the association between these words or phrases and the preferred member in, for example, the preferred member's profile. The preferred member may also provide as input subjects or topics that are of interest to the member.

Facility 202, when processing a new post can determine a subject or topic of the new post in substantially the same manner. Facility 202 can then analyze the recorded association (e.g., subjects or topics) in each preferred member's profile to determine if a new post may be of interest to the preferred member. It will be appreciated that facility 202 can maintain a list of subjects or topics of the threads or discussion groups for other members of the community in addition to or in lieu of the preferred members of the community.

Figure 6:
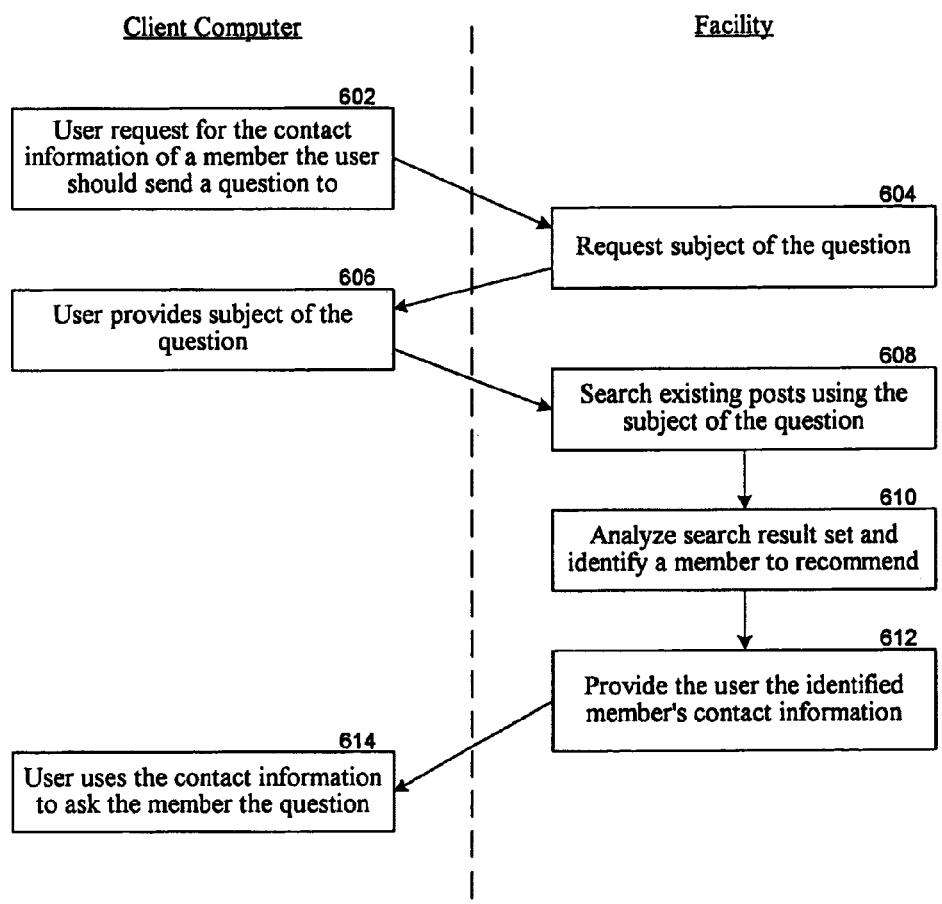
FIG. 6 illustrates a flow chart of an exemplary method by which a community services server computer recommends a member of the community to a user, according to one embodiment.

FIG. 6 illustrates a flow chart of an exemplary method by which community services server computer 106 recommends a member of the community to a user, according to one embodiment. By way of example, a user may be executing an application program on client computer 102. While using the application program, the user may encounter difficulty in figuring out how to perform a certain task. Subsequently, the user may notice a 'Communicate directly with an expert' link that is provided in a tool bar. The link provides access to community services server computer 106 to obtain contact information of a member of the community that may be able to help the user.

At step 602, the user activates a request for the contact information of a member the user should send the question to by clicking on the displayed link. This causes client computer 102 to transmit a message containing the request to facility 202 executing on community services server computer 106.

Facility 202 receives the request and, at step 604, requests a subject of the question from the user. In one embodiment, facility 202 transmits a page through which the user provides the subject of the question to client computer 102, causing client computer 102 to display the page.

At step 606, the user provides the subject of the question in a subject box that is provided on the displayed page. The user then activates a 'continue' or 'submit' button provided on the page, causing client computer 102 to transmit the user entered text to facility 202.

At step 608, facility 202 searches the existing posts using the text contained in the user-provided subject of the question. In one embodiment, facility 202 utilizes search engine 208 to perform the search of the existing posts. At step 610, facility 202 analyzes the search result set to identify a member to recommend to the user. For example, the identified member may be the member who has posted the highest number of answers (e.g., posts that answered a question post) in the search result set.

In another embodiment, facility 202 maintains, for each preferred member of the community, a list of subjects or topics of the threads or discussion groups that the preferred member of the community has participated in. Facility 202 can then analyze the recorded association (e.g., subjects or topics) in each preferred member's profile to identify a preferred member to recommend to the user.

At step 612, facility 202 transmits a page displaying the identified member's contact information to client computer 102, causing client computer 102 to display the page. In one embodiment, facility 202 maintains a member's contact information in the member's profile. For example, the contact information may be provided by the member at the time of registering with the community and may include information such as, the member's email address, the member's homepage URL, the member's phone number, as well as other contact information provided by the member.

At step 614, the user uses the provided contact information to ask the recommended member the question. For example, the user can send the recommended member an email message asking the question.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method in a computing system for recommending a post to a member of a community comprising:
   receiving a message to post to a first discussion group; and
   in response to receiving the message,
   searching a plurality of existing posts in a second discussion group that is different from the first discussion group to identify one or more posts that are similar to the received message based on a comparison of a keyword of a subject of the message and the keywords derived from content of the existing posts; and for at least one of the identified posts that is similar to the received message, identifying a member who posted the identified post that is similar to the received message; and presenting to the identified member the received message as a post in which the member may be interested;

wherein the first discussion group and the second discussion group are online discussion groups having posts of messages.

2. The method of claim 1 further comprising presenting to the identified member a thread that contains the received message.

3. The method of claim 1, wherein the search is a search of the plurality of existing posts using at least a portion of a subject of the message.

4. The method of claim 1, wherein the search is a search of the plurality of existing posts using at least a portion of a body of the message.

5. The method of claim 1, wherein the identified member is a preferred member.

6. The method of claim 1, wherein the identified member posted at least a threshold number of the identified one or more posts.

7. A computer-readable storage device containing computer-executable instructions for controlling a computing device to recommend a post by a method comprising:

receiving from a person a message to post to a first discussion group having existing posts;

identifying an existing post of a second discussion group that is similar to the received message based on content of the existing post and content of the received message, the second discussion group being different from the first discussion group;

identifying a member who posted to the second discussion group the identified post that is similar to the received message, the identified member being a different person than the person from whom the message was received; and presenting to the identified member an indication that the identified member may be interested in the received post wherein the first discussion group and the second discussion group are online discussion groups.

8. The computer-readable storage device of claim 7 wherein the indication is presented to the identified member when the identified member next logs on to a discussion system.

9. The computer-readable storage device of claim 7 further comprising adding the received message as a post of the discussion group.

10. The computer-readable storage device of claim 9 further comprising presenting to the identified member an indication of a thread of the discussion group that contains the added post of the received message.

11. The computer-readable storage device of claim 7 wherein an existing post is identified based on similarity between at least a portion of a body of the received message and the existing post.

12. The computer-readable storage device of claim 7 wherein the identified member posted at least a threshold number of existing posts that are similar to the received message.

13. A computing device for recommending a post comprising:

a memory storing computer-executable instructions of
a component that receives a message to post to a first online discussion group having existing posts;
a component that identifies existing posts of one or more second online discussion groups other than the first online discussion group that are similar to the received message based on similarity between content of the received message and the existing post;
a component that identifies each person who posted each identified post; and
a component that presents to each identified person an indication that the identified person may be interested in the received post; and
a processor that executes the computer-executable instructions stored in the memory.

14. The computing device of claim 13 wherein the indication is presented to each identified person when each identified person next logs on to a discussion system.

15. The computing device of claim 13 further comprising a component that adds the received message as a post of the first online discussion group.

16. The computing device of claim 15 further comprising a component that presents to each identified person an indication of a thread of the discussion group that contains the added post of the received message.

17. The computing device of claim 13 wherein an existing post is identified based on similarity between at least a portion of a body of the received message and the existing post.

18. The computing device of claim 13 wherein each identified person posted at least a threshold number of existing posts that are similar to the received message.

* * * * *